3,548,033
POLYMERIZATION OF MONOMERS WITH
GROUP II–A METAL COMPLEXES
Edgar E. Bostick, Scotia, N.Y., assignor to General Electric Company, a corporation of New York
No Drawing. Original application Aug. 21, 1967, Ser. No. 661,832. Divided and this application July 1, 1969, Ser. No. 849,227
Int. Cl. C08f 15/04
U.S. Cl. 260—879  6 Claims

ABSTRACT OF THE DISCLOSURE

Activated olefinically-unsaturated organic compounds are polymerized with a Group II–A metal-hydrocarbon complex radical ion or dianion. The Group II–A metal-hydrocarbon complexes are produced by the reaction of a Group II–A metal with a conjugated olefinic hydrocarbon or polynuclear hydrocarbon in the presence of specific aprotic dipolar solvents. The Group II–A metal radical anions and dianions are useful in the polymerization of the activated organic compounds to yield rubbery or thermoplastic polymers which are useful as gasketing materials, coatings, molded articles, hoses, wire insulation, dielectric materials, etc.

It has been discovered that the Group II–A metals will form metal complexes with polynuclear hydrocarbons and conjugated hydrocarbons by the reaction of a Group II–A metal with the conjugated olefinic hydrocarbon or polynuclear hydrocarbon in the presence of specific aprotic dipolar solvents.

This application is a division of my copending application Ser. No. 661,832, filed Aug. 21, 1967, entitled Polymerization of Monomers With Group II–A Metal Complexes.

In accordance with the process of this invention, the Group II–A metal is added to a solution of the polynuclear hydrocarbon or conjugated hydrocarbon in an aprotic dipolar solvent such as hexamethylphosphoramide at a temperature of from as low as 15° C. to as high as 100° C. or higher with stirring under an inert atmosphere such as nitrogen, argon, etc., and under anhydrous conditions. It is believed that the reaction takes place in accordance with the following equations to yield the metal complex of the Formula I, $$M° + 2R \rightleftarrows M^{++}[R]_2^-\qquad(I)$$
$$I + M° \rightleftarrows 2M^{++}[R]^{--}\qquad(II)$$

wherein M is a Group II–A metal and R is a polynuclear hydrocarbon or a conjugated olefinic hydrocarbon as hereinafter defined.

The form in which the metal is added to the reaction mixture is not critical. The metal can be added as a finely divided powder, turnings, wire, or as an amalgem, or from a deposit of a suitable clean metal mirror substrate.

The temperature at which the reaction is conducted can range from as low as 5° C. to as high as 120° C. It is preferred for ease of reaction and convenience to employ temperatures in the range of 15° C. to 100° C.

The reaction can be conducted at atmospheric pressure, sub-atmospheric pressure or super-atmospheric pressure. It is essential that the reaction be conducted in an inert atmosphere under anhydrous conditions: for example, the inert atmosphere can be obtained by vacuum techniques or by employing a blanket of an inert gas such as nitrogen, argon, helium, krypton, neon, etc. It is essential that these gases be free of oxygen and oxides of carbon.

The metals which can be employed to produce the catalyst complexes of this invention are the Group II–A metals, commonly called the alkaline earth metals and include beryllium, magnesium, calcium, strontium and barium.

In producing the Group II–A metal complexes of this invention, the Group II–A metals and polynuclear hydrocarbon or conjugated olefinic hydrocarbons are employed in equivalent amounts, i.e., at least 1 mole of the hydrocarbon for each mole of the Group II–A metal. It is particularly preferred, for completeness of reaction and ease of handling of the complex, to employ an excess of the hydrocarbon.

The solvents which must be employed in the process of this invention are selected aprotic dipolar solvents such as, for example, hexamethylphosphoramide (HMPT), octamethyl pyrophosphoramide, tetrahydrofuran, ethyleneglycol dimethyl ether, diethyleneglycol dimethyl ether, N,N,N',N' - tetramethylethylenediamine, and mixtures thereof. The solvents employed in the process of this invention must be of extremely high purity, i.e., contain less than 0.1 part per million of impurities.

In addition to the above selected aprotic solvents, one of which must be employed in the process of this invention, one can also employ other non-reactive hydrocarbon solvents such as benzene, toluene, zylene, etc.

The metal complex catalyst of this invention can be isolated from the solutions in which they are prepared by precipitation, drying, recrystallization, and other techniques to yield solid metal complexes which can then be employed as a polymerization catalyst as set forth in the polymerization process of this invention. These Group II–A metal complex-hydrocarbon adducts are compounds which are stabilized by virtue of their coordination with the particular aprotic solvents which are employed in the process of this invention. These Group II–A metal-hydrocarbon complexes do not exist per se but exist as complexes with the solvent and thus are very sensitive to ambient conditions and to atmospheric moisture, oxides of carbon, etc.

By the term "polynuclear hydrocarbons" as employed herein is meant those hydrocarbons containing 2 or more aromatic or heterocyclic pseudoaromatic rings in direct conjugation or fusion and having available low energy orbitals capable of electron acceptance, for example, biphenyl, naphthalene, anthracene, acenaphthalene, rubrene, phenanthracene, benzonaphthalene, fluorene, meta - terphenyl, paraterphenyl, quaterphenyl, perylene, pyrene, chrysene, 3,4-benzpyrene, tetracene, hexacene, and heptacene, etc.

By the term "conjugated hydrocarbons" as employed herein is meant, stilbene, 1,1-diphenylethylene, cyclooctatetraene, cyclooctadiene, cyclooctatriene, styrene, α-methylstyrene, β-methylstyrene, isoprene, butadiene, etc., that is, hydrocarbons containing double bonded carbons that conjugate with other double bonded carbon atoms either aliphatic or aromatic in character. These conjugated hydrocarbons other than the cyclooctapolyenes are more readily pictured as having the general formula

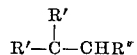

where R' is an alkyl (i.e., methyl, ethyl, propyl, butyl, dodecyl, octadecyl, etc.) or aryl group (i.e., phenyl, biphenyl, naphthyl, tolyl, xylyl, etc.) or a

group and R'' is a hydrogen, alkyl or aryl, and where the unsatisfied values are satisfied by a member selected from the class consisting of hydrogen and monovalent hydrocarbon radicals.

Illustrative of the Group II–A metal complexes which are produced in accordance with this invention are, for example,

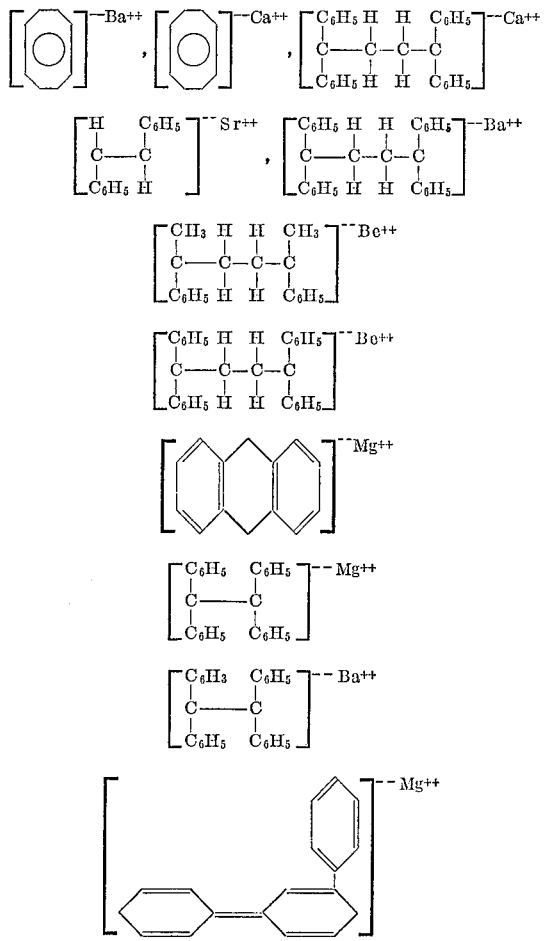

The metal complex catalysts of this invention are useful to prepare polymers by polymerization of activated olefinically-unsaturated organic compounds. In conducting the polymerization of the activated olefinically-unsaturated organic compounds in accordance with this invention, one places the metal complex catalyst in the reactor either in the presence or absence of the aprotic solvent and adds the activated olefinically-unsaturated organic compound with stirring at a temperature of from 5° C. to 120° C. or higher so that the olefinically-unsaturated compound is polymerized by anionic addition polymerization to yield high molecular weight polymers.

The amount of the complex metal catalyst is not narrowly critical. Thus, for example, one can employ from one catalyst equivalent per 6 monomer units to one catalyst equivalent per 10,000 monomer units dissolved in the critical solvent and with or without an additional solvent and the activated olefinically-unsaturated compound added thereto at a temperature from 5° C. to 120° C., whereby the olefinically-unsaturated compound is polymerized by anionic addition polymerization to yield a polymer.

As in the preparation of the metal complex, the polymerization process must be conducted under anhydrous conditions and in an inert atmosphere free of oxygen, oxides of carbon and any acidic compounds. Although a solvent is not necessary in conducting the polymerization process of this invention, a solvent can be employed if desired for ease of recovery of reaction products, ease of controlling the reaction to give a more homogeneous or uniform polymerization product. This is especially true where multiple sequence additions of the same or a different activated olefinically-unsaturated monomer at different stages of the reaction process, thereby giving block sequences in the polymer product.

The solvents which can be employed in the polymerization process of this invention are the solvents given above for the preparation of the metal complex catalysts. The amount of solvent employed in the process of this invention is not narrowly critical and can range from 10 parts to 1000 or more parts solvent for each 100 parts of the activated olefinically-unsaturated compound employed in the polymerization process of this invention.

The polymerization process of this invention can be conducted at sub-atmospheric, atmospheric or super-atmospheric pressures. It is preferred to conduct the process at atmospheric pressure for convenience and ease of construction of the apparatus. The pressure at which the process is operated will generally be determined by the boiling point of the activation olefinically-unsaturation organic compounds.

By the term "activated olefinically-unsaturated organic compound" as employed herein is meant an organic compound containing a vinyl group which is conjugated with a second double- or triple-bonded moiety, e.g.,

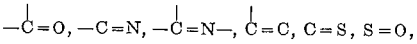

etc. Illustrative of these activated olefinically-unsaturated organic compounds are the alkyl acrylate and methacrylate, for example, methacrylate, ethylacrylate, n-hexylacrylate, laurylmethacrylate, phenylmethylacrylate, etc.; the vinyl cyanides such as acrylonitrile, methacrylonitrile, etc.;: vinylidenecyanide; vinylaryl compounds such as styrene, α-methylstyrene, para-methoxystyrene, 4 - vinyldiphenyl, 2- and 4-vinylpridines, vinylnaphthalene, etc.; salts of acrylates, e.g., barium, sodium, potassium, calcium, acrylates, and methacrylates, etc; the dienes, e.g., butadiene, isoprene, 2,3-dimethylbutadiene, cis- and trans-1,3-pentadiene, etc. In addition one can copolymerize 1,1-diphenylethylene and stilbene with 2,3-dimethylbutadiene, isoprene, butadiene and 1,3-pentadiene to yield alternating copolymers.

The polymerization process of this invention when employed to copolymerize stilbene and isoprene produces a novel copolymeric composition consisting essentially of repeating units of the following formula

I

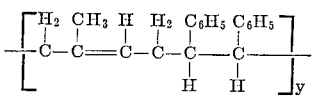

wherein $y$ is an integer of 6 to 10,000 or more. It has also been found possible by the polymerization process of this invention to copolymerize isoprene and 1,1-diphenylethylene to give a polymer consisting essentially of alternating isoprene units and 1,1-diphenylethylene units and consisting essentially of the formula

II

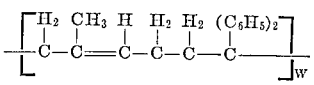

wherein $w$ is an integer of 6 to 10,000 or more.

The polymers produced employing the polymerization system of this invention are high molecular weight resinous and/or rubbery materials which find use as molding compositions, wire insulations, coatings, as film for wrapping, etc. The rubbery high molecular weight polymers produced by the polymerization process of this invention and specifically the isoprene and stilbene alternating copolymers and the (isoprene-1,1-diphenylethylene) alternating copolymers can be compounded with fillers such as carbon black, silica, fumed silica, clay, diatomaceous earth and oils, for example, naphthenic oils, and a curing catalyst such as sulfur mercaptobenzothiazole, mercapto benzothiazyldisulfide or other known rubber curing agents, including $\alpha$-$\alpha$-azo-bis-isobutyronitrile and free radical catalysts, and heat-cured to yield elastomeric compositions which are useful as gaskets, sealing compounds, and the like.

The following examples serve to further illustrate this invention. All parts are, by weight, unless otherwise specifically set forth.

EXAMPLE 1

Calcium (2 grams), mercury (5 ml.) and hexamethylphosphoramide (25 ml.) were placed in a 100 ml. 3-neck round bottom flask fitted with condenser, $N_2$ by-pass, two 2″ tubes with rubber serum closures, and a glass-covered magnetic stirring bar. The reaction mixture was stirred for 2 hours to form the calcium amalgam as a suspension in the solvent. Trans-stilbene (9 grams) was then adder under a nitrogen blanket. Reaction was immediately obvious due to the formation of a green color. Stirring was continued at room temperature. Reaction proceeded to produce an intense olive green color within an hour. This solution comprising the calcium trans-stilbene adduct was stored under nitrogen.

EXAMPLE 2

Magnesium metal (0.48 gram, 0.020 mole) was placed in a 100 ml., 3-neck round bottom flask fitted with condenser, nitrogen by-pass, two-rubber serum cap closures and a glass-covered magnetic stirring bar. Hexamethylphosphoramide, (40 ml.) and mercury (2 ml.) were added. The reaction mixture was stirred under nitrogen for 30 minutes in order to initiate amalgamation to produce a gray suspension. Cyclooctatetraene, (2.5 ml., 0.024 mole) was then added to the gray suspension and stirring was continued under nitrogen at room temperature (27° C.) for 16 hours. The resulting blue solution of magnesium cyclooctatetraene adduct was retained under nitrogen. An aliquot of the solution was precipitated by addition of excess n-hexane to produce blue crystals, which had the stoichiometry,

EXAMPLE 3

Strontium powder (5 grams), freshly filed under nitrogen, was slurried in 10 ml. freshly distilled hexamethylphosphoramide with cyclooctatetraene (5 ml., 0.048 mole) under a nitrogen blanket at room temperature for 96 hours. A deep blue color developed in the early stages of the reaction and persisted. The resulting metal complex catalyst solution was stored at room temperature under nitrogen.

This solution was active as a catalyst for the ploymerization of acrylonitrile, methacrylonitrile, and methylmethacrylate. A portion of the solution was treated with excess n-hexane to yield purple crystals which were active as polymerization catalysts. Stoichiometry by titration equivalence was:

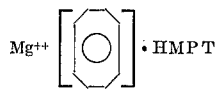

$n=1$–$4$.

EXAMPLE 4

Finely ground barium (0.7 gram, ~0.005 mole) was opened and added under a $N_2$ blanket to 14 ml. hexamethylphosphoramide in a 100 ml. 2-neck round bottom flask fitted with glass-covered magnetic stirring bar, condenser, $N_2$ by-pass and 3″ tube with serum closure. The suspension was stirred at room temperature for a day. No color or solvated metal was evident. Then 0.53 ml. cyclooctatetraene was added. A faint green color was immediately obvious. This faint green color had become intensely purple by the end of 1½ hours reaction time. The reaction was filtered and the resulting purple solution was stored in the dark at room temperature. An aliquot of this material was placed in a suitable sample tube and found to be diamagnetic by electron spin resonance spectroscopy, which is consistent with a structure, a barium cation associated with a cyclooctatetraenyldianion. Addition of n-hexane allowed separation of deep blue crystals which had a neutralization equivalence for the following structure:

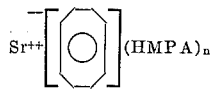

EXAMPLE 5

Beryllium metal powder (1 gram) was slurried in dry, freshly distilled hexamethyphosphoramide (50 ml.) with mercury (5 ml.) and reacted with 1,1-diphenylethylene (18 grams) under a dry nitrogen atmosphere for 48 hours at 75° C. A deep red-colored solution formed which was active as catalyst for the polymerization of styrene, methylmethacrylate, acrylonitrile, methacrylonitrile, and reacted with $\alpha$-methyl styrene to form low molecular weight polymers. The primary adduct was also formed from beryllium metal and $\alpha$-metal styrene in the same procedure as described above.

EXAMPLE 6

Magnesium metal turnings (2.4 gms. 0.1 m.) and mercury (10 ml.) were slurried with 40 ml. dry, freshly-distilled hexamethylphosphoramide in a 500 ml. 3-neck round bottom flask equipped with glass-covered magnetic stirring bar, condenser, $N_2$ by-pass, and glass stoppers. The reaction mixture was stirred for one hour under dry nitrogen at room temperature in order to initiate amalgamation. Metaterphenyl (23 gms., 0.1 m.) was then added and the reaction was stirred and warmed to 60° C. for 16 hours. The resulting red solution was used as catalyst for polymerization reaction. This solution was diluted with tetrahydrofuran and was found to be effective as a catalyst for polymerization of styrene, methylmethacrylate, isoprene, acrylonitrile and methacrylonitrile and copolymerization of isoprene with stilbene or 1,1-diphenylethylene.

EXAMPLE 7

Strontium metal filings (1.3 gms.), freshly prepared under nitrogen, and several drops of mercury were slurried in 20 ml. dry, freshly-distilled hexamethylphosphoramide under dry nitrogen at room temperature (27° C.). Trans-stilbene, (2.3 gms.) was added and reacted for 24 hours, at room temperature. A deep purple-colored solution resulted. This solution was used as catalyst for the polymerization of styrene, methylmethacrylate, acrylonitrile, and methacrylonitrile, and copolymerization of isoprene with stilbene or 1,1-diphenylethylene. A part of this solution was treated with solid dry $CO_2$ and subsequent acidification. The recrystallized product was a 25% yield of stilbene-1,2-dicarboxylic acid, melting point 224° C.

Percent C (calc.=71.2%, found=70.6%)
Percent H (calc.=5.19%, found=5.2%)

EXAMPLE 8

2.74 grams of finely ground barium was added to 20 ml. dry hexamethylphosphoramide in a 100 ml. 3-neck round bottom flask fitted with condenser, $N_2$ by-pass, glass stopper and a rubber serum closure, 1,1-diphenylethylene (4.5 ml.) dry, freshly distilled, was added through the serum stopper to the magnetically stirred suspension. The solution slowly became a dark blue-green, then changed to a deep red color. The deep-red solvated complex could be precipitated by the addition of n-hexane. The solution was used for the polymerization of styrene, isoprene, methylmethacrylate, acrylonitrile, and methacrylonitrile.

EXAMPLE 9

Trans-stilbene (2.3 grams) was dissolved in 30 ml. freshly distilled hexamethylphosphoramide, under a nitrogen atmosphere; 3 ml. of a freshly prepared strontium trans-stilbene complex in hexamethylphosphoramide solution prepared as in Example 7 was added until the dark color of the complex persisted. Isoprene (2 ml., 1.4 grams, ~0.2 mole), freshly distilled from metallic sodium mirrors, was added to the catalyst/stilbene solution. Reaction immediately proceeded as evidenced by a steady exotherm and an increase in viscosity of the reaction mixture. After several hours, the reaction cooled and was worked up by adding 15 ml. of benzene containing phenyl-$\beta$-naphthylamine antioxidant (100 mg./liter) and pouring the entire reaction mixture into 500 ml. of isopropanol. The resulting polymer precipitate was redissolved in benzene, filtered, reprecipitated in methanol, and the precipitated solid extracted with isopropanol for 18 hours in a Soxhlet apparatus. Yield of fractionated polymer was 73% of theoretical. Intrinsic viscosity, as measured in benzene at 25° C., was 0.60 dl./g. The polymer structure was analyzed by PMR as having the formula

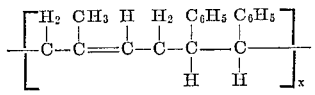

where $x$ has an average value of about 500. The polymer had a softening point of 126° C.

EXAMPLE 10

A solution of benzene (30 ml., anhydrous, oxygen-free) and hexamethylphosphoramide (5 ml.) containing the magnesium adduct of cyclooctatetraene, as prepared in Example 2, was prepared in a round bottom flask under a nitrogen atmosphere. Styrene (7 ml., freshly distilled from BaO) was added with stirring. An immediate polymerization reaction ensued to produce a very viscous solution. Additional styrene (3 ml.) in 20 ml. benzene was mixed with the reaction. The abnormally high viscosity inhibited the mixing process. The reaction was worked up by dilution with benzene which contained a small amount of methanol for termination of the catalyst system. The resulting solution and slurry of catalyst residues was centrifuged, filtered and precipitated in methanol. The yield of polystyrane was 6.32 grams.

EXAMPLE 11

Styrene (5 grams) freshly distilled and dried was added to 25 ml. dry, oxygen-free tetrahydrofuran in a stirred round bottom flask under nitrogen. Then, the complex adduct of magnesium with m-terphenyl, prepared as in Example 6, (1 ml. of hexamethylphosphoramide) was added. Polymerization proceeded to cause an increase in the viscosity of the system. After 12 hours at 27° C., the reaction was worked up in the same manner as described previously to yield a high molecular weight polystyrene.

EXAMPLE 12

Styrene (5 gms.), freshly distilled and dried, was added to 25 ml. dry, oxygen-free tetrahydrofuran in a stirred round bottom flask under nitrogen. Then, 0.1 ml. of the calcium adduct of stilbene, prepared as in Example 1, in hexamethylphosphoramide was added to initiate polymerization. Polymerization was rapid with high increase in viscosity of the reaction mixture. Work-up of the reaction by pouring into methanol, filtering out the polymer, washing with methanol and drying, gave a high molecular weight polystyrene whose molecular weight was 500,000 gm./mole as determined by dilute solution viscosity measurements and which could be pressed into a clear film.

EXAMPLE 13

Methylmethacrylate (4.5 gms., 0.045 mole), freshly dried and distilled, was added through a rubber serum closure to a clean dry nitrogen-pressured flask. Then, the magnesium adduct of meta-terphenyl (0.2+10$^{-3}$ mole in 0.2 mole hexamethylphosphoramide), prepared as in Example 6, was added and mixed as rapidly as possible with the monomer. Polymerization was spontaneous to give a large viscous lump of material. Polymer was isolated by addition of methanol to destroy active catalyst, then diluted with benzene and precipitated in a large excess of cold methanol. The polymer was dried to give a white, tough thermoplastic.

EXAMPLE 14

1,1-diphenylethylene (3.6 gms.), dry, freshly distilled, was co-reacted with isoprene (0.08 gms.), freshly dried and distilled from sodium metal mirrors, in hexamethylphosphoramide with the strontium complex adduct of stilbene, as prepared in Example 7, as the polymerization initiator. The reaction proceeded rapidly and exothermically to produce a highly viscous solution. The products were isolated by pouring the reaction mixture into methanol, filtering, washing, and drying. The isolated polymer was purified by redissolution in benzene, reprecipitation in methanol, and drying. The product (5.2 gms., 81% yield) was a hard white material which softened between 110°–120° C. and was analyzed by nuclear magnetic resonance techniques to support a 50/50 isoprene/1,1-diphenylethylene copolymer structure with the following representative formula:

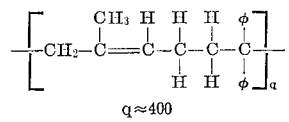

It will, of course, be apparent to those skilled in the art that modifications other than those set forth in the above examples can be employed in the process of this invention without departing from the scope thereof.

What is claimed is:

1. A process which comprises forming a mixture of a Group II–A metal hydrocarbon complex and a conjugated olefinically unsaturated organic compound where there is employed from 6–10,000 monomer units, per complex unit at a temperature of from 50° C. to 120° C. to effect the polymerization of the conjugated olefinically unsaturated organic compound, where the Group II–A metal hydrocarbon complex is a complex of a Group II–A metal and a polynuclear hydrocarbon or conjugated hydrocarbon.

2. A process as in claim 1 wherein the organo Group II–A metal-hydrocarbon complex is a complex of strontium and stilbene and the conjugated olefinically-unsaturated organic compound is acrylonitrile.

3. A process as in claim 1 which also employs a solvent selected from the class consisting of hexamethylphosphoramide, octamethylpyrophosphoramide, tetrahydrofuran, ethyleneglycol dialkyl ethers, diethyleneglycol dialkyl ethers, N,N,N',N'-tetramethylethylenediamine and mixtures thereof.

4. A process as in claim 1 where the Group II–A metal complex is a complex of strontium and stilbene and the conjugated olefinically-unsaturated compound is a mixture of stilbene and isoprene.

5. A process as in claim 1 where the Group II–A metal complex is a complex of strontium and 1,1-diphenylethylene and the conjugated olefinically-unsaturated organic compound is a mixture of 1,1-diphenylethylene and isoprene.

6. A process as in claim 1 wherein there is added sequentially 2 or more different conjugated olefinically unsaturated organic compounds thereby forming a block-block copolymer.

References Cited

UNITED STATES PATENTS

| | | | |
|---|---|---|---|
| 3,388,179 | 6/1968 | Ramsden | 260—665 |
| 3,351,646 | 11/1967 | Ramsden | 260—665 |
| 3,354,190 | 11/1967 | Ramsden | 260—665 |
| 3,448,176 | 6/1969 | Balas | 260—880 |
| 3,479,320 | 11/1969 | Bostick | 260—46.5 |

JOSEPH L. SCHOFER, Primary Examiner

R. A. GAITHER, Assistant Examiner

U.S. Cl. X.R.

260—80, 82.1, 85.5, 88.3, 88.7, 89.5, 93.5, 911, 942